United States Patent
Park et al.

(10) Patent No.: US 11,760,866 B2
(45) Date of Patent: Sep. 19, 2023

(54) WHITE PIGMENT COMPRISING ZIF-BASED POWDER, POLYMER RESIN FILM AND METHOD FOR CHANGING COLOR OF MEDIUM USING WHITE PIGMENT

(71) Applicant: LG CHEM, LTD., Seoul (KR)

(72) Inventors: Kyosung Park, Daejeon (KR); Jungkeun Kim, Daejeon (KR); Hyounsoo Uh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 493 days.

(21) Appl. No.: 16/638,989

(22) PCT Filed: Aug. 16, 2018

(86) PCT No.: PCT/KR2018/009403
§ 371 (c)(1),
(2) Date: Feb. 13, 2020

(87) PCT Pub. No.: WO2019/035664
PCT Pub. Date: Feb. 21, 2019

(65) Prior Publication Data
US 2020/0362143 A1    Nov. 19, 2020

(30) Foreign Application Priority Data

Aug. 16, 2017 (KR) .................. 10-2017-0103628
Aug. 16, 2018 (KR) .................. 10-2018-0095280

(51) Int. Cl.
*C08K 5/56* (2006.01)
*C09D 7/41* (2018.01)
(Continued)

(52) U.S. Cl.
CPC .................. *C08K 5/56* (2013.01); *C07F 3/06* (2013.01); *C08J 5/18* (2013.01); *C09B 57/00* (2013.01); *C09D 7/41* (2018.01); *C08J 2333/20* (2013.01)

(58) Field of Classification Search
None
See application file for complete search history.

(56) References Cited

U.S. PATENT DOCUMENTS 11,007,391 B1 * 5/2021 Peterson ............... C07F 19/005
2002/0176978 A1   11/2002 Murschall et al.
(Continued)

FOREIGN PATENT DOCUMENTS

CN    101432070 A    5/2009
CN    102267736 A    12/2011
(Continued)

OTHER PUBLICATIONS

Datasheet for ZIF-8, 4 pages, date unknown, retrieved from internet May 2022. (Year: 2022).*

(Continued)

*Primary Examiner* — Robert S Loewe
(74) *Attorney, Agent, or Firm* — ROTHWELL, FIGG, ERNST & MANBECK, P.C.

(57) ABSTRACT

The present invention provides a white pigment comprising a ZIF-based (zeolitic imidazolate framework) powder having a structure in which zinc (Zn) and an imidazole-based organic substance are bonded, a polymer resin film comprising the white pigment and a method for changing a color of a medium using the white pigment.

6 Claims, 4 Drawing Sheets

(51) Int. Cl.
  *C07F 3/06*   (2006.01)
  *C08J 5/18*   (2006.01)
  *C09B 57/00*  (2006.01)

(56) References Cited

U.S. PATENT DOCUMENTS

| | | | | |
|---|---|---|---|---|
| 2018/0178191 | A1* | 6/2018 | Schwab | C08J 5/18 |
| 2018/0320000 | A1* | 11/2018 | Zhang | A01N 43/50 |
| 2018/0333696 | A1* | 11/2018 | Burckhart | C07F 1/08 |
| 2020/0306698 | A1* | 10/2020 | Stark | H01M 8/1046 |

FOREIGN PATENT DOCUMENTS

| | | | | |
|---|---|---|---|---|
| CN | 102335626 | A | 2/2012 | |
| CN | 103951684 | A | 7/2014 | |
| CN | 105985362 | A | 10/2016 | |
| JP | 2000-344903 | A | 12/2000 | |
| JP | 2017-512891 | A | 5/2017 | |
| JP | 2019-513893 | A | 5/2019 | |
| KR | 10-2001-0029694 | A | 4/2001 | |
| KR | 10-2016-0096958 | A | 8/2016 | |
| WO | 2015/144695 | A1 | 10/2015 | |
| WO | WO-2015144695 | A1* | 10/2015 | B01J 20/226 |
| WO | WO-2017089410 | A1* | 6/2017 | B01J 20/226 |
| WO | 2017/152240 | A1 | 9/2017 | |

OTHER PUBLICATIONS

Ban et al. "Confinement of ionic liquids in nanocages: tailoring the molecular sieving properties of ZIF-8 for membrane-based CO2 capture." Angewandte Chemie International Edition 54.51 (2015): 15483-15487. (Year: 2015).*

Supporting Information for Ban et al. "Confinement of ionic liquids in nanocages: tailoring the molecular sieving properties of ZIF-8 for membrane-based CO2 capture." 38 pages, 2015. (Year: 2015).*

Mahdi, E. M. et al. "Dynamic molecular interactions between polyurethane and ZIF-8 in a polymer-MOF nanocomposite: Microstructural, thermo-mechanical and viscoelastic effects." Polymer 97 (2016): 31-43. (Year: 2016).*

Ebrahimi, Mostafa et al. "Rapid room temperature synthesis of zeolitic imidazolate framework-7 (ZIF-7) microcrystals." Materials Letters 189 (2017): 243-247. (Year: 2017).*

He, Ming, et al. "Toluene-assisted synthesis of RHO-type zeolitic imidazolate frameworks: synthesis and formation mechanism of ZIF-11 andZIF-12." Dalton Transactions 42.47 (2013): 16608-16613. (Year: 2013).*

Sánchez-Laínez, Javier, et al. "Beyond the H 2/CO 2 upper bound: one-step crystallization and separation of nano-sized ZIF-11 by centrifugation and its application in mixed matrix membranes." Journal of Materials Chemistry A 3.12 (2015): 6549-6556. (Year: 2015).*

Chi, Won Seok, et al. "Mixed matrix membranes consisting of SEBS block copolymers and size-controlled ZIF-8 nanoparticles for CO2 capture." Journal of Membrane Science 495 (2015): 479-488. (Year: 2015).*

He, Ming, et al. "Synthesis of zeolitic imidazolate framework-7 in a water/ethanol mixture and its ethanol-induced reversible phase transition." ChemPlusChem 78.10 (2013): 1222-1225. (Year: 2013).*

International Search Report and Written Opinion issued for PCT Application No. PCT/KR2018/009403 dated Dec. 18, 2018, 8 pages.

Bansal, P. et al., "Zn Based Metal Organic Framework as Adsorbent Material for Mecoprop", Research Journal of Recent Sciences, Jul. 2013, vol. 2(7), 84-86.

Al-Kutubi, H. et al., "Facile formation of ZIF-8 thin films on ZnO nanorods", CrystEngComm, 2015, vol. 17, 5360-5364.

Park, M-J., et al., "Zeolitic-imidazole framework thin film-based flexible resistive switching memory", RSC Adv., 2017, vol. 7, 21045-21049.

Ming HE et al., "Synthesis of Zeolitic Imidazolate Framework-7 in a Water/Ethanol Mixture and Its Ethanol-Induced Reversible Phase Transition", ChemPlusChem, Communications, (Oct. 2013) vol. 78, Issue10, pp. 1222-1225.

E. M. Mahdi et al., "Mixed-matrix membranes of zeolitic imidazolate framework (ZIF-8)/Matrimid nanocomposite: Thermo-mechanical stability and viscoelasticity underpinning membrane separation performance", Journal of Membrane Science, UK, 2015, 498, 276-290.

Yichang Pan et al., "Rapid synthesis of zeolitic imidazolate framework-8 (ZIF-8) nanocrystals in an aqueous system", Chemical Communications, 2011, 47, 2071-2073.

Li Z and Meng F, Guidance on pharmaceutical chemistry, China Medical Science Press, 2016, pp. 69-72, with partial English translation.

European Search Report issued for European Patent Application No. 18846391.3 dated Jun. 19, 2020, 8 pages.

Pan et al., "Rapid synthesis of zeolitic imidazolate framework-8 (ZIF-8) nanocrystals in an aqueous system", Chemical Communications, (2011) vol. 47, No. 7, pp. 2071-2073.

He et al., "Synthesis of Zeolitic Imidazolate Framework-7 in a Water/Ethanol Mizture and Its Ehanol-Induced Reversible Phase Transition", Chempluschem, (2013) vol. 78, No. 10, pp. 1222-1225.

Mahdi et al., "Mixed-matrix membranes of zeolitic imidazolate framework (ZIF-8)/Matrimid nanocomposite: Thermo-mechanical stability and viscoelasticity underpinning membrane separation performance", Journal of Membrane Science, (2016) vol. 498, pp. 276-290.

\* cited by examiner

[Figure 1]
[Figure 2]

[Figure 3]
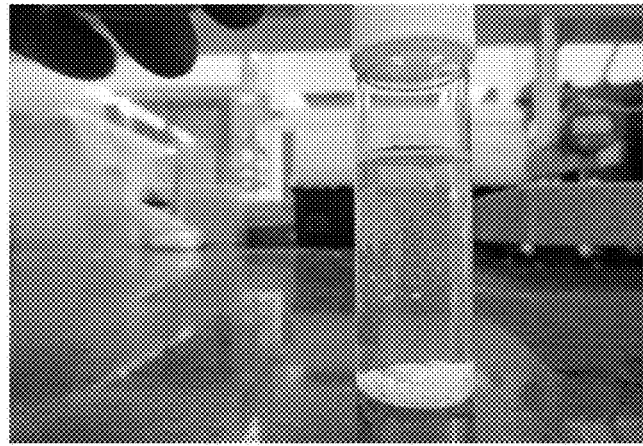
[Figure 4]
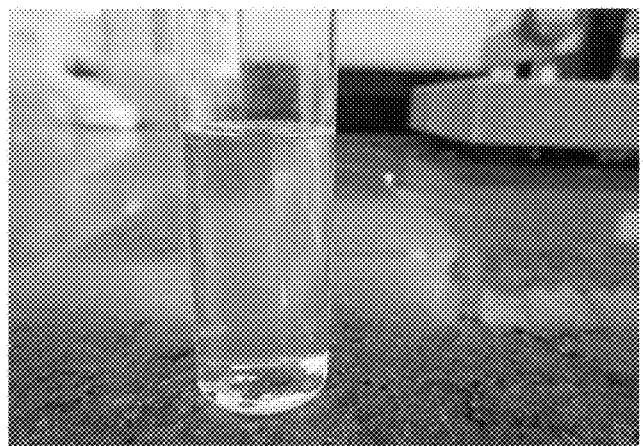
[Figure 5]
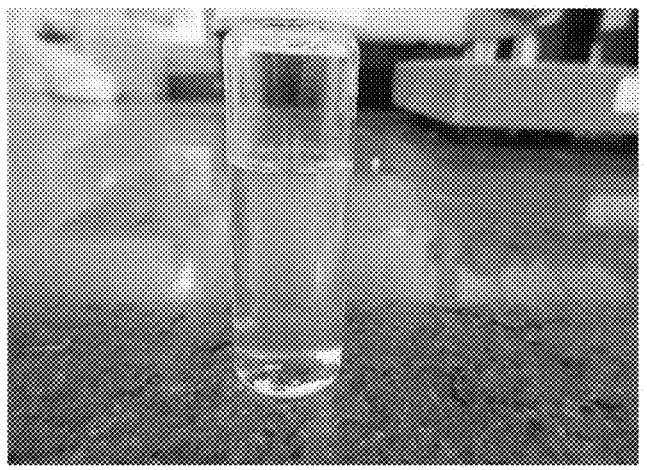

[Figure 6]
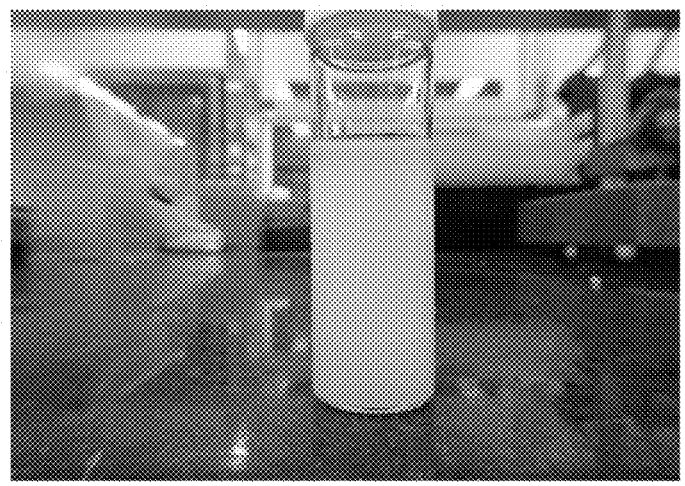
[Figure 7]
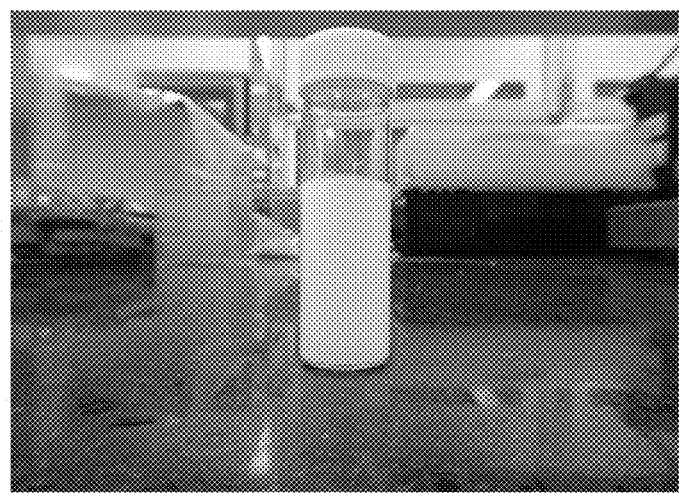

[Figure 8]
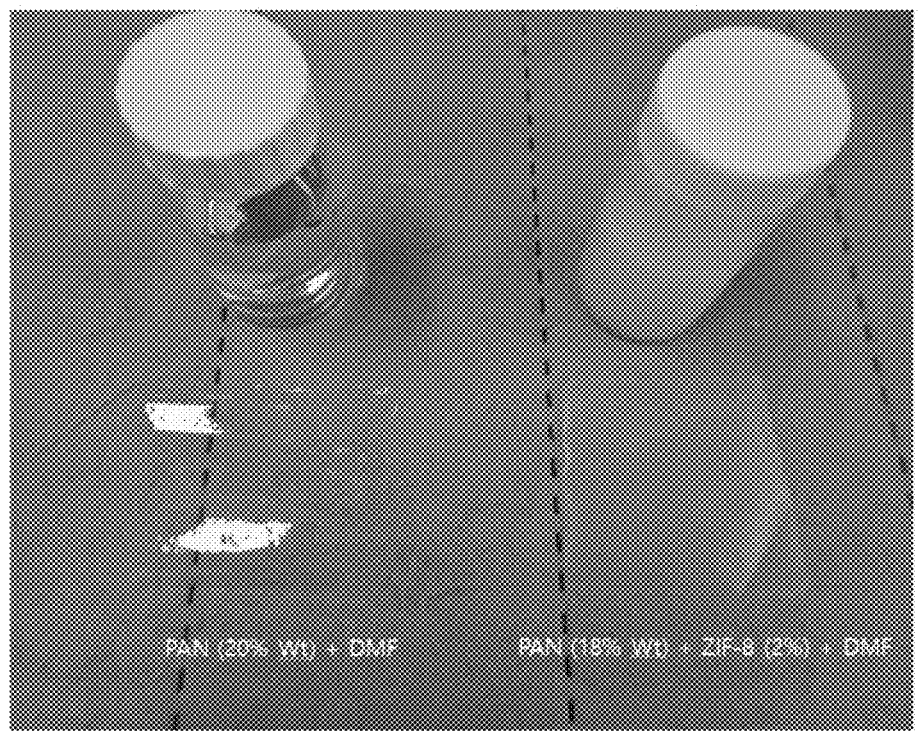

WHITE PIGMENT COMPRISING ZIF-BASED POWDER, POLYMER RESIN FILM AND METHOD FOR CHANGING COLOR OF MEDIUM USING WHITE PIGMENT

CROSS-REFERENCE TO RELATED APPLICATION(S)

This application is a 35 U.S.C. § 371 National Stage of International Patent Application No. PCT/KR2018/009403, filed Aug. 16, 2018, designating the United States, which claims the benefit of priority based on Korean Patent Application No. 10-2017-0103628 filed on Aug. 16, 2017 and Korean Patent Application No. 10-2018-0095280 filed on Aug. 16, 2018, the disclosures of which are incorporated herein by reference in their entirety.

The present invention relates to a white pigment comprising a ZIF-based powder, a polymer resin film and a method for changing a color of a medium using the same.

BACKGROUND ART

Inorganic pigments, especially titanium dioxide pigments, have been often incorporated into various matrices as whiteners, tinting agents or opacifiers. Titanium dioxide, in particular, efficiently scatters light due to its high refractive index, which has been therefore most widely used in the world as the most important white pigment for applications in paints and coatings, plastics, paper and fibers.

In addition, even when titanium dioxide is ingested, it does not have toxicity, and thus it is one of the materials that raise annual sales of trillions of won as the pigment for toothpastes, paints and plastics.

However, recently, while the European Environmental Protection Agency (EU EPA) has raised a problem that when this titanium dioxide enters the lungs through breathing, it has carcinogenic potential, it is possible that titanium dioxide is designated as a potential carcinogen.

Titanium dioxide is a material having high stability, which does not degrade under normal conditions, and when it is deposited in the respiratory organs, it does not decompose and remains attached to the inside of the lungs, thereby causing micro-inflammation of the lungs, where this inflammation is likely transferred to cancer cells.

Until now, the most widely known substance that causes cancer due to inhalation is asbestos, and it has been reported that when asbestos is ingested orally, it does not cause any serious problems, but when asbestos enters the lungs through the respiratory organs as described above, it does not decompose internally and is attached to the lungs to cause inflammation reaction, which is transferred to cancer, thereby adding credibility to the above-mentioned assertion.

Therefore, there is a need for a safe white pigment which is not toxic even when inhaled.

DISCLOSURE

It is an object of the present invention to solve such problems of the prior art and the technical problems required from the past.

Specifically, it is an object of the present invention to provide a safe white pigment which is free from toxicity even when inhaled, using a substance decomposed under the conditions inside the respiratory organs as a white pigment.

Also, it is an object of the present invention to provide a polymer resin film comprising a safe white pigment which is not toxic even when inhaled.

Furthermore, it is an object of the present invention to provide a method for changing a color of a medium, using a safe white pigment which is not toxic even when inhaled.

The white pigment for attaining such objects comprises a ZIF-based (zeolitic imidazolate framework) powder having a structure in which zinc (Zn) and an imidazole-based organic substance are bonded.

The ZIF-based powder is one of metal organic frameworks (MOFs), where the metal organic framework is a microporous crystal material composed of metal atoms or metal clusters and organic linkages connecting them by coordination bonds, which is a relatively new hybrid organic-inorganic material.

The pore size and physical/chemical properties of this material can be easily controlled by selection of appropriate metal atoms and organic linkages. Because of these particular properties, it has shown potential applied possibility as gas storage and/or absorption, catalysis, and membranes, and the like.

On the other hand, zeolitic-imidazolate frameworks (ZIFs) are composed of metal ions (usually zinc or cobalt) linked to imidazolate (or imidazolate derivative) ligands. The metal-linkage-metal bond angle (ca. 145°) of the ZIF-based material is close to the Si—O—Si bond angle found in many zeolites but it has a distinct difference in its constituent elements. Therefore, these ZIF-based materials have attracted attention because of their superior thermal and chemical stability along with ultrafine porosity and have been widely applied in industrial fields.

However, as described above, ZIF-based materials have only been used for gas separation, storage absorption, catalysts, chemical sensors, and the like.

However, recently, in some studies, it has been reported that ZIF-based materials are used as drug delivery materials, and it has also been reported that they do not show toxicity in animals. In particular, research has also revealed that while ZIF-based materials dissolve around cancer cells, which have weak acidity, the ZIF-based materials have a function to accurately transfer cancer drugs contained therein to the cancer cells.

Accordingly, in the present invention, a white pigment which does not accumulate in the lungs has been developed by utilizing the characteristics of ZIF-based materials that are readily soluble in acidity.

That is, existing titanium dioxide, zeolite and the like are not decomposed under acidic conditions, and when they enter the lungs through inhalation, they have a problem of being deposited in the lungs without being decomposed, but when the ZIF-based material is used, the ZIF-based powder is easily decomposed in the weakly acidic pulmonary cells, so that particles are not attached to the lungs, whereby the present invention has been completed by confirming that it is likely not to cause inflammation and the carcinogenic potential can be significantly lowered.

Generally, the ZIF-based material is made by bonding one or more metal ions of Cd, Zn, Co, B, Mg, Cu and Mn with an imidazole derivative in which the 1,3-nitrogen of the imidazole ring is not substituted with other functional groups other than hydrogen so as to be capable of binding to the metal ions.

Some of the ZIF-based materials, which are white in color and composed of metals without known toxicity, can be applied as white pigments. Also, ZIF-based materials, which have characteristics of easily decomposing under weak acidic conditions, particularly, in the venous blood of the lungs and are expected to be free of inhalation toxicity, are classified as follows: 1. it will consist of Zn ions; 2. it will consist of imidazole without functional groups, which cause lung inflammation, such as sulfonate, amine and halogen; 3. there will be no significant price difference as compared to titanium dioxide.

ZIF-based materials satisfying all of these conditions may include materials such as Zn, and imidazole, 2-alkylimidazole and benzimidazole.

Until now, however, the ZIF-based materials have been synthesized through heating reaction using amide series solvents such as dimethylformamide, dimethylacetamide, diethylformamide and N-methylpyrollidine. However, in this case, the ZIF material itself has a white color, but it has a light yellow or brown color due to the color that the impurities, such as amine, formed during the heating process of the solvent decompose.

Accordingly, the inventors of the present invention have conducted intensive studies to confirm that when Zn-ZIFs are prepared by a method of (1) performing the reaction at room temperature or low temperature (2) without using an amide series solvent, a pure white product can be obtained without generating impurities, and thus they have found that the ZIF-based powder produced by this method can be replaced with a white pigment.

In the method of producing such a ZIF powder, for example, zinc nitrate heptahydrate is completely dissolved in ethanol and ammonia water is added to this solution. In another container, ethanol and benzimidazole are completely dissolved and then mixed with the above-prepared solution Immediately after mixing, a white emulsion is generated, and after stirring the generated emulsion, a white solid phase ZIF-based powder can be obtained by using a centrifuge.

Conventionally, such ZIF-based powders have been produced by a small-scale hot-water method or solvothermal synthesis method which takes a long time to form a required level of crystallinity, and porous networks, but recently, in order to produce a large amount of ZIF-based powder, attempts have been made to use microwaves or ultrasonic waves or to combine electrical/mechanical methods. There is also an approach to redesign the reactor for producing the ZIF powder in large quantities. As one example, Room-Temperature Synthesis of ZIF-8: The Coexistence of ZnO Nanoneedles (*Chem. Mater.* 2011, 23, 3590-3592) has disclosed that it is possible to mass-produce ZIF-8 easily using a ball mill, and Faustini et al. proposed a microfluidic method capable of synthesizing various kinds of MOFs continuously in a short time (M. Faustini et al., Microfluidic approach toward continuous and ultrafast synthesis of metal-organic framework crystals and hetero structures in confined microdroplets, J. Am. Chem. Soc. 135 (2013) 14619-14626).

Here, the ZIF-based powder to be used in the present invention is not limited, which may be produced according to various production methods as disclosed above by modifying them so as to satisfy the conditions capable of obtaining the pure white product.

On the other hand, as described above, in the white pigment according to the present invention, among these ZIF-based powders, one or more selected from the group consisting of a compound in which zinc (Zn) and imidazole are bonded, a compound in which zinc (Zn) and 2-methylimidazole are bonded, and a compound in which zinc (Zn) and benzimidazole are bonded, can be preferably used, and specifically, a compound in which zinc (Zn) and one or more of imidazole-based organic substances expressed by the following formulas are bonded can be preferably used.

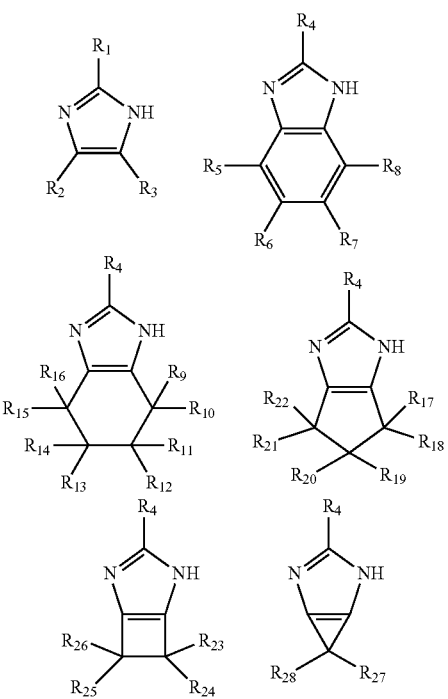

In such ZIF-based powders, the zinc (Zn) may have a structure coordinatively bonded to the nitrogen atom of the above-described imidazole-based organic substances.

The shape of the ZIF powder may be variously obtained according to the manufacturing method, without limitation, but may be, for example, a spherical, rhombic, hexahedral, or rod shape. At this time, the shape of the ZIF powder used as the white pigment may be specifically a spherical or hexahedral shape.

When such a ZIF-based powder is used as a white pigment, it may be contained in an amount of 80 to 100 wt % based on the total weight of the white pigment in consideration of the degree of damage to the human body, and specifically, the ZIF-base powder is 100 wt %, where it may also be composed of only the ZIF-based powder.

On the other hand, when the ZIF powder is contained in an amount of less than 100 wt %, the other constitution is not limited to materials that can be used as conventional white pigments, and for example, a material such as titanium dioxide ($TiO_2$) can be used together.

In addition, the present invention may also provide a polymer resin film comprising the white pigment and a polymer resin.

As described above, as a white pigment comprising a ZIF-based (zeolitic imidazolate framework) powder having a structure in which zinc (Zn) and an imidazole-based organic substance form bonds is mixed with or dispersed in a polymer resin, the color of the polymer resin film to be finally produced can be more easily controlled, where the white pigment has a characteristic of being easily decomposed in a weakly acidic condition, in particular, in the venous blood of the lungs and has a characteristic of being substantially free from inhalation toxicity, so that it can replace polymer materials, and the like, comprising the conventional white pigment such as titanium dioxide.

The type of the polymer resin included in the polymer resin film is not greatly limited, but may be, for example, polyacrylonitrile, polypropylene, polyethylene, polyethylene terephthalate, polycarbonate, polymethyl methacrylate, poly (meth)acrylate, polyimide, polyamide such as nylon, polyvinyl chloride, polyethylene oxide, polypropylene oxide, a mixture of two or more thereof, a copolymer of two or more thereof, or a composite of two or more thereof.

In addition, the content of the white pigment in the polymer resin film is not greatly limited, and the content may vary depending on the specific application in which the polymer resin film is used, and the like, and for example, the polymer resin film may comprise the white pigment in an amount of 1 wt % to 30 wt %.

The present invention also provides a method for changing a color of a medium using a pigment composition comprising the white pigment.

At this time, the medium may be a plastic, a water-soluble gel, a paste, a paint or a coating liquid, and the like.

In addition to the ZIF-based powder, the pigment composition may further comprise other pigments having a color other than white, for example, red, blue, green or the like.

On the other hand, the content of the white pigment in the pigment composition may be in a range of 0.5% or more to 99.5% or less by weight, and the color of the medium can be determined depending on the content of such a ZIF-based powder and other contained materials, for example, other pigments.

Furthermore, when the ZIF-based powder is used as a white pigment, various additives, for example, a dispersant, a light stabilizer, and the like may be added to the medium depending on the properties of the substrate of the medium, but this is not essential.

Advantageous Effects

As described above, the white pigment according to the present invention is stable to moisture and heat, and is decomposed under weak acidic conditions to become soluble in water, by comprising the ZIF-based powder, and thus, when the white pigment is used to enter the inside of the human respiratory organs, it is easily decomposed in the lung cells with weak acidity due to the carbon dioxide in the blood, so that it is not likely to cause inflammation with the lungs attached, which can function as a safe white pigment without inhalation toxicity.

BRIEF DESCRIPTION OF DRAWINGS

FIG. 1 is a powder photograph of ZIF-8;
FIG. 2 is a powder photograph of ZIF-8;
FIG. 3 is a photograph immediately after ZIF-8 powder is put into a weak acid solution;
FIG. 4 is a photograph after ZIF-8 powder is put into a weak acid solution and then sonication is performed using a sound wave of 20 kHz for 5 seconds;
FIG. 5 is a photograph after ZIF-8 is put into a weak acid solution and sonication is performed for 5 seconds using a sound wave of 20 kHz;
FIG. 6 is a photograph after $Al_2O_3$ is put into a weak acid solution and then sonication is performed for 10 minutes using a sound wave of 20 kHz;
FIG. 7 is a photograph after $TiO_2$ is put into a weak acid solution and then sonication is performed for 10 minutes using a sound wave of 20 kHz.
FIG. 8 shows the polymer resin dispersion liquids and the polymer resin films obtained in Example 3 and Comparative Example 3, respectively.

DETAILED DESCRIPTION OF INVENTION

Hereinafter, the present invention will be described with reference to examples according to the present invention, but this is for easier understanding of the present invention and the scope of the present invention is not limited by them.

EXAMPLES 1 TO 2 AND COMPARATIVE EXAMPLES 1 to 2

Preparation of White Pigment

Example 1

0.5 g of zinc nitrate heptahydrate was completely dissolved in 30 ml of ethanol, and 5 ml of ammonia water was added to this solution. In another container, 10 ml of ethanol and 0.3 g of benzimidazole were completely dissolved and then mixed with the above-prepared solution Immediately after mixing, a white emulsion was generated, and after stirring the generated emulsion for 10 minutes, a white solid phase ZIF-8 powder was obtained by using a centrifuge.

A photograph of this ZIF-8 powder was shown in FIG. 1.

Referring to FIG. 1, it was confirmed that the ZIF-8 was white in a solid powder state.

Example 2

ZIF-8 powder was also synthesized by a method similar to that of Example 1 above.

A photograph of this ZIF-8 powder was shown in FIG. 2.

Referring to FIG. 2, it can be confirmed that the ZIF-8 is also white in the powder state.

Comparative Example 1

$Al_2O_3$ powder was prepared.

Comparative Example 2

$TiO_2$ powder was prepared.

Experimental Examples 1 and 2

Experimental Example 1: Determination of Decomposition in a Weakly Acidic Aqueous Solution The ZIF-8 powder of Example 1, the ZIF-8 powder of Example 2, the $Al_2O_3$ powder of Comparative Example 1 and the $TiO_2$ powder of Comparative Example 2 were each added by 0.5 g to a weak acid aqueous solution (pH: 6) to confirm the decomposition, and the results were shown in FIGS. 3 to 7.

Referring to FIGS. 3 to 7, it can be seen that the $Al_2O_3$ powder of Comparative Example 1 and the $TiO_2$ powder of Comparative Example 2 do not change, whereas the ZIF-based powders are completely decomposed and dissolved.

Experimental Example 2: Evaluation of Inhalation Toxicity

For the ZIF-8 prepared in Example 1, an inhalation toxicity experiment was performed according to the OECD Guideline 436 (Acute Inhalation Toxicity—Acute Toxic Class Method). Three female and three male experimental rodents were placed in an inhalation chamber, a sample injection mask was connected to the nose of each subject, and then the ZIF-8 aerosol was generated using water as a medium and injected into the subject. The input concentration was set at 5 mg/L, and it was injected for 4 hours and the states of the subjects were observed for 14 hours, and it was confirmed that one of them died.

As a result, it was confirmed that the ZIF-8 of Example 1 belonged to the non-hazardous substance group as an LC50 (50% lethal concentration when inhaled) of 5.2 mg/L.

Example 3 and Comparative Example 3: Production of Polymeric Resin Film

Example 3

The ZIF-8 powder of Example 1 and a polyacrylonitrile resin were dispersed in dimethylformamide so as to be 2 wt % and 18 wt %, respectively, from which a polymer resin film was produced.

Comparative Example 3

A polyacrylonitrile resin was dispersed in dimethylformamide so as to be 20 wt %, from which a polymer resin film was produced.

As shown in FIG. 8, it was confirmed that the polymer resin film of Comparative Example 3 had a light yellow color, whereas the polymer resin dispersion of Example 3 had an opaque white color, and the finally provided polymer resin film also represented an opaque white color.

The invention claimed is:

1. A method for producing a white pigment for inhalation through the respiratory organs comprising:

dissolving zinc nitrate heptahydrate in ethanol and ammonia water to prepare a first solution, dissolving an imidazole-based organic substance in ethanol to prepare a second solution, mixing the first and second solutions, recovering a white pigment; and dispersing the white pigment in a polymer resin to prepare a polymer resin film;

wherein the white pigment is suitable for inhalation through the respiratory organs and comprises a zeolitic imidazolate framework (ZIF)-based powder having a structure in which zinc (Zn) and the imidazole-based organic substance are bonded, wherein the ZIF-based powder is a compound in which zinc (Zn) and benzimidazole are bonded, and wherein the ZIF-based powder is contained in an amount of 80 to 100 wt % based on the total weight of the white pigment, and wherein the polymer resin film comprises 11 wt % to 30 wt % of the white pigment based on the total weight of the polymer resin film.

2. The method according to claim 1, wherein the ZIF-based powder comprises an organic-inorganic composite in which the zinc (Zn) and the nitrogen atom of the imidazole-based organic substance form a coordinate bond.

3. The method according to claim 1, wherein the polymer resin comprises one or more polymer resins selected from the group consisting of polyacrylonitrile, polypropylene, polyethylene, polyethylene terephthalate, polycarbonate, polymethyl methacrylate, poly(meth)acrylate, polyimide, polyamide, polyvinyl chloride, polyethylene oxide and polypropylene oxide.

4. The method according to claim 1, further comprising dispersing in a medium a pigment composition comprising the white pigment.

5. The method according to claim 4, wherein the pigment composition comprises the white pigment in a range of 0.5% to 99.5% by weight based on the total weight of the pigment composition.

6. The method according to claim 1, wherein the polymer resin is a plastic, a water-soluble gel, a paste, a paint, or a coating liquid.

* * * * *